United States Patent Office 3,043,237
Patented July 10, 1962

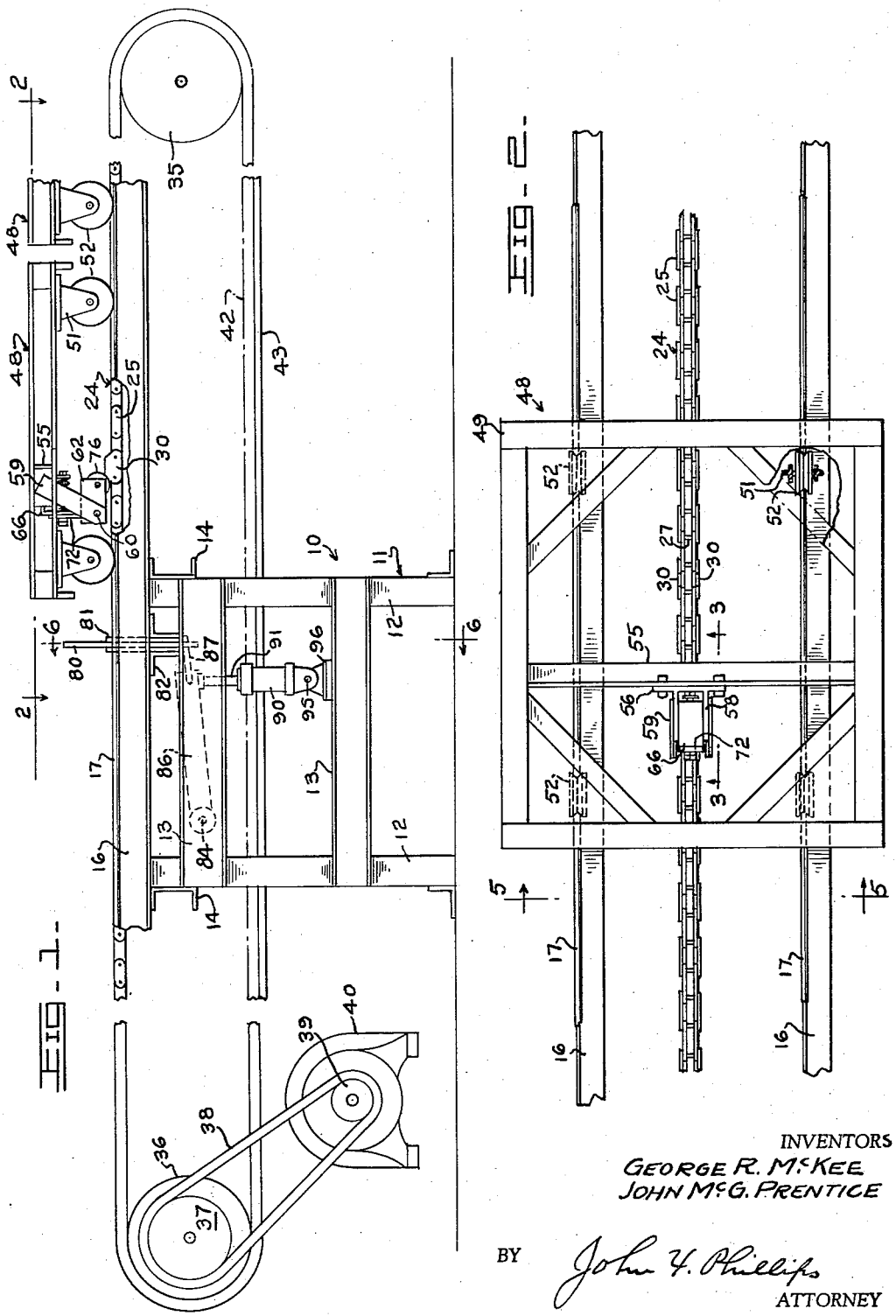

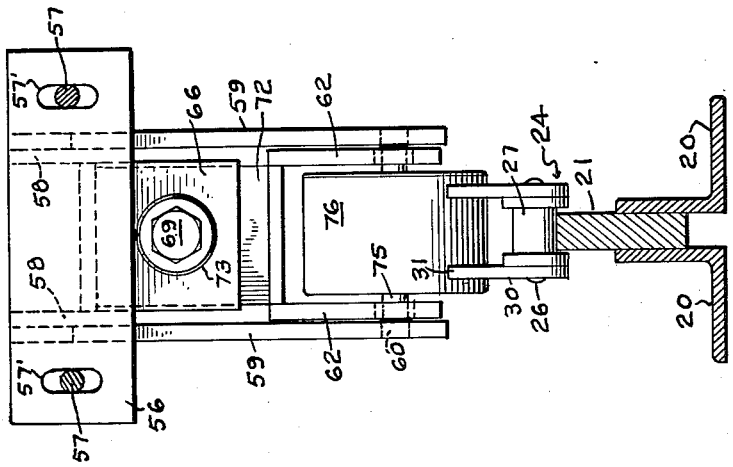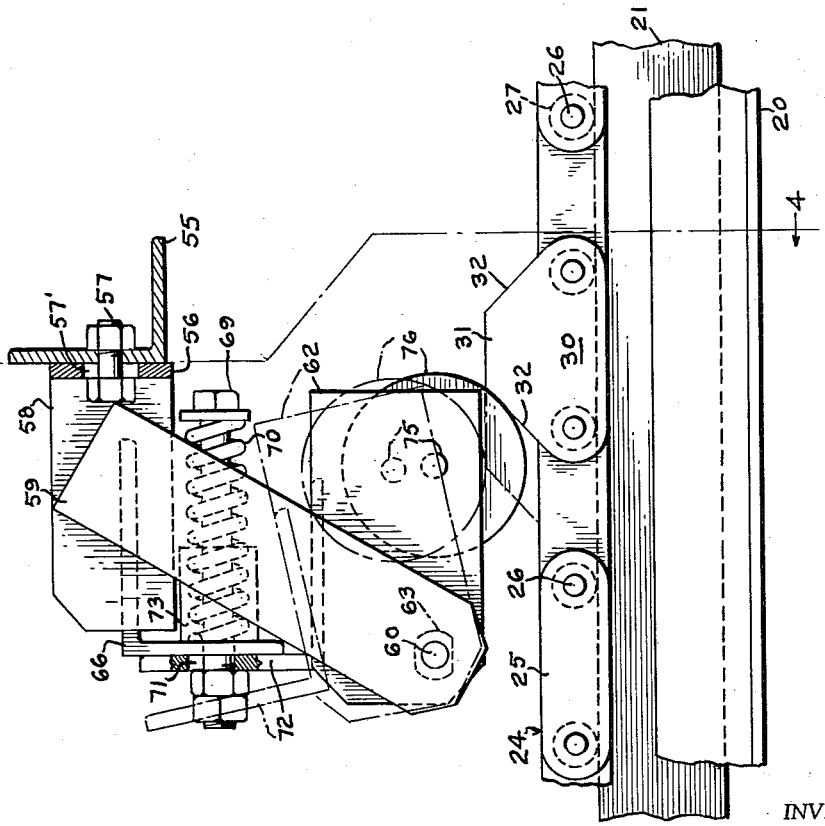

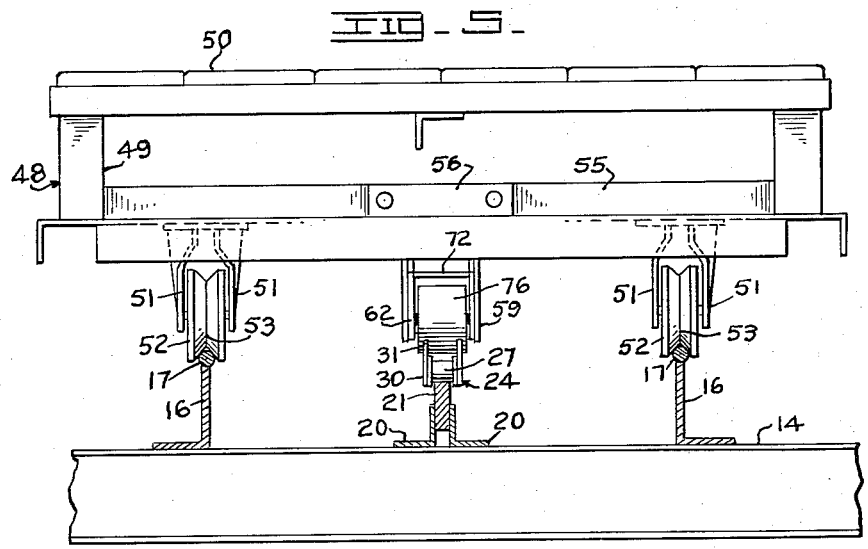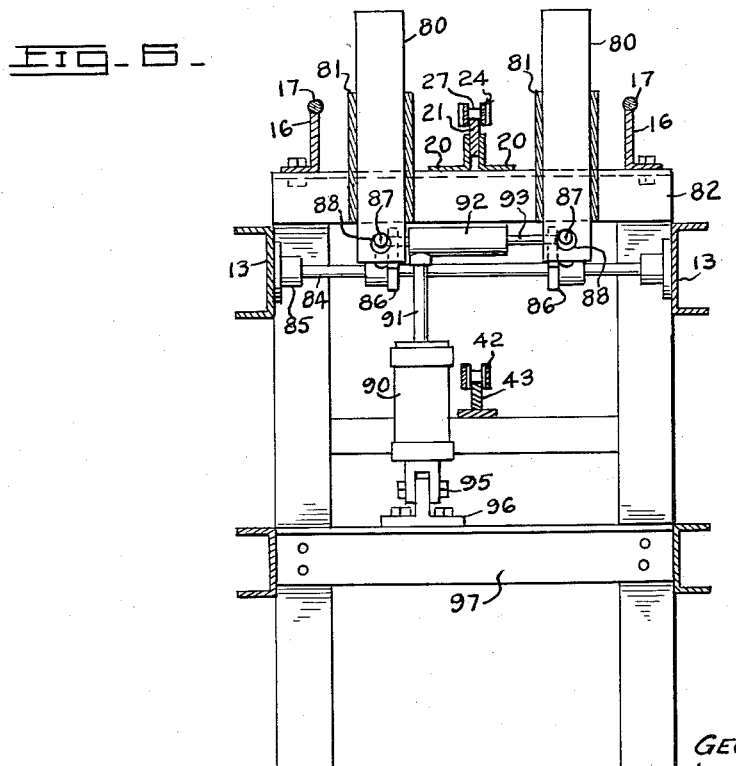

3,043,237
CHAIN CONVEYOR FOR DOLLIES
George R. McKee, Louisville, and John McG. Prentice, St. Mathews, Ky., assignors to Logan Co., Louisville, Ky., a corporation of Kentucky
Filed May 15, 1959, Ser. No. 813,385
12 Claims. (Cl. 104—172)

This invention relates to a chain conveyor for dollies.

In the manufacture of a number of products, it is customary to convey the articles through one or more successive work stations where it is desirable to stop the dollies on which the articles are conveyed for the purpose of performing operations thereon. For example, in the manufacture of sanitary ware such as cast iron bathtubs, lavatories, and the like, the articles are supported on dollies which are propelled by suitable conveying means past many work stations where the articles are cleaned, ground, etc. It is desirable in a conveying mechanism of this type to provide a structure through which the dolley may be stopped at each work station without stopping the conveyor, perform the necessary operation thereon and then release the dolly for movement to the next work station or conveyor discharge point.

An important object of the present invention is to provide a novel type of conveying means of the character referred to, wherein an article conveying dolly, or any other device propelled by a conveyor, readily may be arrested without stopping the operation of the conveyor merely by obstructing the movement of the dolly or the like until a given operation has been performed on the article.

A further object is to provide such a conveying mechanism wherein the connection between the dolly and the propelling chain or other flexible element is such that the dolly may be stopped and the driving connection automatically released for continued movement of the propelling chain until the dolly is released by the operator after the performance of work thereon.

A further object is to provide a conveying mechanism of this character wherein the propelling flexible element is in the form of a chain having at spaced points therealong links provided with upwardly projecting portions having cam means at their forward ends engageable by means carried by the dolly and spring-urged into engagement with the cam means so that the spring-urged means will "give" to release the propelling connection between the dolly and the chain at any work station by the placing of an obstacle in the path of the dolly to arrest its movement.

Other objects and advantages of the invention will become apparent during the course of the following description.

In the drawings I have shown one embodiment of the invention. In this showing:

FIGURE 1 is a side elevation of a portion of the mechanism, certain of the driving parts being diagrammatically shown;

FIGURE 2 is a horizontal sectional view on line 2—2 of FIGURE 1;

FIGURE 3 is an enlarged sectional view on line 3—3 of FIGURE 2;

FIGURE 4 is a section taken substantially on line 4—4 of FIGURE 3;

FIGURE 5 is a sectional view on an enlarged scale taken on line 5—5 of FIGURE 2; and FIGURE 6 is an enlarged sectional view on line 6—6 of FIGURE 1.

Referring to the drawings, the numeral 10 designates supporting frame means as a whole for the conveyor, only a portion of which is shown in FIGURE 1, as will become apparent. The supporting means comprises preferably a plurality of separate supports 11, one of which is shown in FIGURE 1, these supports being spaced apart at suitable intervals depending upon the total length of the conveyor which will be determined by the work stations past which the articles are to be conveyed.

Each supporting structure 11 comprises legs 12, longitudinally extending bases 13 and transverse supporting structural members 14. The structural members 14 of the various supporting structures 11 have secured to the top thereof spaced parallel angle irons 16 (FIGURES 5 and 6). Welded to the tops of the vertical flanges of such angle irons are steel bars 17 forming tracks for the wheels of dollies to be described.

Centrally of the space between the angle irons 16 is arranged a pair of angle irons 20, and between the vertical flanges of such angle irons is secured a rail 21 of the cross-sectional shape clearly shown in FIGURE 4, the upper edge of this rail extending substantially above the angle irons 20 for a reason which will become apparent.

An endless flexible element is employed for propelling the dolly to be described. Such flexible element in the present case is in the form of a chain indicated as a whole by the numeral 24 and comprising links 25. These links are connected to each other by pins 26, and between the inner links (FIGURE 4) a roller 27 surrounds each pin 26.

Certain of the chain links are differently formed, for example the outer overlapping links 30 (FIGURE 3). These links are spaced apart at suitable intervals and have portions 31 projecting upwardly above the upper plane of the upper run of the chain, and preferably opposite ends of the projecting portions 31 are inclined as at 32 to form cam surfaces for a purpose to be described. The upper run of the chain travels over the rail 21 with the rollers 27 in engagement with the upper edge of the rail 21, as shown in FIGURE 4.

The chain passes at one end of the conveyor around a sprocket diagrammatically shown in FIGURE 1 and indicated by the numeral 35. This sprocket may be supported in any suitable manner, preferably with a conventional take-up operative longitudinally of the conveyor for tightening the chain, as will be obvious. The opposite end of the chain 24 passes around a drive sprocket 36, also diagrammatically shown in FIGURE 1. This sprocket is driven by a sprocket 37 through the medium of a chain 38 passing around a drive sprocket 39 on the shaft of a motor 40. It will be apparent that the particular motive power for driving the chain is of no importance per se in the operation of the present apparatus. The lower run 42 of the chain is supported on a plate or track 43 carried by the several supporting structures 11. The particular structure of the supporting rail 43 is of no importance per se in connection with the present invention.

The articles on which work is to be performed are carried on dollies, each of which is indicated as a whole by the numeral 48. One of these dollies is shown in its entirety in FIGURE 1, with a portion of a following dolly. Each of these dollies comprises a structural frame 49 of any suitable type, and the top of the dolly may be boarded or otherwise covered to provide an article-supporting platform 50. This platform is omitted in FIGURE 2 for the purpose of illustration, this section being taken just below the platform 50 in FIGURE 1. Adjacent each corner of each dolly are provided depending bearings 51 fixed to the frame 49, and each pair of bearings rotatably supports a roller 52 grooved as at 53 to ride along the rails 17.

Each dolly is provided with means for establishing a yieldable driving connection with the chain links 30. The frame structure 49 of each dolly is shown as including a transverse angle iron 55 which carries the elements of the driving connection. Such connection comprises an attaching plate 56 (FIGURES 3 and 4) bolted as at 57 to the vertical flange of the angle iron 55, the ends of the attaching plate 56 being vertically slotted as at 57' for the attaching bolts 57 to provide for vertical adjustment of the elements carried by the plate 56. This plate includes spaced parallel forwardly extending plates 58, to the outer faces of which are welded downwardly and forwardly extending plates 59 carrying adjacent their lower ends a pivot pin 60. This pin pivotally supports spaced parallel plates 62 for swinging movement about the pivot pin 60. The pivot pin 60 is preferably fixed to the plates 59 and extends through bushings 63 having opposite flats fitting in similarly shaped openings in the plates 62.

An angle iron 66 has a horizontal flange extending between and welded to the plates 58 and has a depending flange through which extends a bolt 69. Between the head of this bolt and the vertical flange of the angle 66 is arranged a compression spring 70. Forwardly of the angle iron 66, the shank of the bolt 69 passes through a vertically elongated opening 71 in the vertical flange of an angle iron 72. The lower horizontal flange of this angle iron is arranged between and welded to the plates 62 to fix these elements with respect to each other. The spring has one end housed in a guide tube 73.

An axle pin 75 passes between and through the plates 62 to rotatably support with respect to the latter a roller 76, the normal position of which is shown in solid lines in FIGURE 3. This position is occupied by the roller when the vertical flange of the angle 72 lies against the vertical flange of the angle iron 66 as shown in solid lines in FIGURE 3. It will be noted that the bottom of the roller 76, when the roller is in normal position, lies a little above the plane of the top of the upper run of the chain 24 but below the plane of the tops of the projections 31 of the chain links 30 and in the path of travel of such projections. When the leading cam edge 32 of one of these projections engages a roller 76, this roller swings the plates 66 upwardly, swinging the angle iron 72 to move the vertical flange thereof away from the vertical flange of the angle iron 66, the pivoting parts assuming the broken line positions shown in FIGURE 3. This operation takes place when movement of a dolly is arrested in the manner to be described, thus permitting chain projections 31 to pass beneath the roller 76 for continued movement of the conveyor chain while the dolly is stopped for the performance of operations on the article or articles supported thereby.

One type of arresting means for a dolly is shown in FIGURES 1 and 6. Such arresting means is in the form of vertically elongated spaced plates 80 mounted in the spaces between the rail 21 and the dolly supporting tracks 17. The arresting plates 80 are mounted for vertical sliding movement in guides 81 fixed to angle irons 82 secured against the bottoms of the angle irons 16.

Between the structural members 13 (FIGURE 6) is arranged a horizontal shaft 84 mounted in bearings 85 carried by the members 13. The shaft 84 carries a pair of arms 86, and welded to such arms adjacent the free ends thereof and projecting longitudinally therefrom are rods 87 projecting through openings 88 in the arresting plates 80. It will be apparent that when the arms 86 are swung upwardly at their free ends, the arresting plates 80 are elevated into the path of travel of a dolly to arrest movement thereof.

Any suitable means may be employed for swinging the arms 86. In the present instance, a hydraulic cylinder and piston device 90 has an upwardly extending piston rod 91 connected by a cross head 92 to a cross bar 93 projecting through the arms 86. The lower end of the hydraulic cylinder and piston device is pivotally supported as at 95 on a bearing 96 fixed to a cross member 97 of the frame structure 11. The admission of hydraulic fluid to, and the exhaustion of such fluid from, the cylinder 90 is controlled by any suitable type of valve mechanism (not shown).

*Operation*

The chain 24 is driven from the motor 40 as previously described. The upper run of the chain moves toward the left as viewed in FIGURES 1 and 2. A loaded dolly is moved onto the conveying structure in any suitable manner, with articles thereon on which work operations are to be performed. One of the chain link projections 31 engages the roller 76 of the dolly thus placed in position, and the dolly will be propelled by the chain from right to left in FIGURE 1. The nuts on the bolt 69 may be turned to adjust the loading of the spring 70 to predetermine the force necessary to move the roller upwardly over the leading cam surface 32. The amount of resistance offered by the spring 70 to turning movement of the plates 62 and angle iron 72 depends upon the energy requirements for accelerating the dolly from rest to operating speed and propelling the loaded dolly. Obviously, over-preloading the spring would unduly increase resistance against stopping and holding a dolly.

Assuming that the spring 69 is properly adjusted, engagement of the leading cam face 32 will propel the dolly by engagement with the roller 76. When it is desired to stop a dolly at a work station, the arresting plates 80 at such station will be moved upwardly by admitting hydraulic fluid to the cylinder and piston device 90. This operation swings the arms 86 upwardly, and the pins or rods 87 will elevate the arresting plates 80 so that they will lie in the path of travel of the forward end of the dolly as shown in FIGURE 1. When the forward end of the dolly engages the plates 80, movement of the dolly will be arrested. Continued movement of the upper run of the chain will cause the leading cam surfaces 32 of the links 30 (FIGURE 3) to elevate the roller 76, swinging the plates 62 and angle iron 72 against the tension of the spring 70. Thus the link projections 31 will pass beneath the roller 76, and movement of the propelling chain will continue at a uniform speed. The dolly will remain at the work station until the desired operation has been performed on the article or articles on the dolly. Pressure is then released from the piston and cylinder device 19, and arresting plate 80 will be lowered. When the next propelling chain links 30 engage the roller 76, the dolly will be propelled to the next work station or moved from the discharge end of the conveying apparatus.

When a dolly 48 is stopped by engagement with the plates 80, the following dolly will continue to move forwardly until it reaches and is held stationary by the previously stopped dolly. On a long conveyor, a number of the dollies could be so held stationary adjacent a work position for the performance of work on articles on a number of dollies. Thus the apparatus forms an accumulating conveyor for the stopping of a number of article-carrying dollies or other devices, without interruption to operation of the propelling means, namely, the chain 24.

While the invention has been shown in connection with the carrying of articles on dollies of a specific type, it will be understood that the invention is not limited to the specific arrangement of parts shown. For example, the article-carrying members could be pallets rolling over conveyor rollers, instead of mounting a dolly on wheels to run on rails, as illustrated.

It is to be understood that the form of the invention shown and described is to be taken as a preferred example of the same and that various changes in the shape, size, and arrangement of the parts may be made as do not depart from the spirit of the invention or the scope of the appended claims.

We claim:

1. A conveying mechanism comprising an endless flexible propelling unit having an upward projection, an article supporting carriage movably supported above said endless unit, and a releasable driving connection between said carriage and said projection, said driving connection comprising a member connected to said carriage, said projection having cam action engagement with said member, and yieldable means connected between said member and said carriage whereby said member is released from driving connection with said projection by said cam action for continued movement of said endless member without propelling said carriage when movement of the latter is arrested.

2. A conveying mechanism comprising an endless flexible propelling unit having an upward projection, an article supporting carriage movably supported above said endless unit, and a releasable driving connection between said carriage and said projection, said driving connection comprising a member connected to said carriage, said projection having cam action engagement with said member, means supporting said member relative to said carriage for movement therewith whereby engagement of said projection with said member propels said carriage, and yieldable means between said member and said carriage for releasing said member from driving engagement with said projection through said cam action for passage of the latter under said member when movement of said carriage is arrested.

3. A conveying mechanism comprising an endless flexible propelling unit having an upward projection, an article supporting carriage movably supported above said endless unit, said projection having a leading edge inclined from the vertical away from the direction of movement of said flexible unit to form a cam face, and a driving connection between said projection and said carriage, said driving connection comprising a member engageable with said projection, motion transmitting means connected between said member and said carriage whereby the latter will be propelled by engagement of said cam face with said member, said member being mounted for upward movement relative to said projection, and resilient means opposing such upward movement of said member with a predetermined force whereby, when movement of said carriage is arrested, said cam face will move said member upwardly and said flexible unit will continue to move without imparting motion to said carriage.

4. A conveying mechanism comprising a carriage, means for supporting said carriage for horizontal linear movement, a drive chain having an upper run movable in one direction parallel to said linear movement and including a link projecting upwardly from said chain, and a driving connection between said link and said carriage, said driving connection comprising a member supported by said carriage in the path of travel of said link whereby the latter will propel said carriage with the upper run of said chain, said link having cam action engagement with said member, said member being supported for upward movement, and resilient means connected to oppose such upward movement of said member with a predetermined force whereby said carriage will be normally propelled by said link and said member will be movable upwardly by said cam action for the passage of said projection thereunder when movement of said carriage is arrested.

5. A conveying mechanism according to claim 4 wherein said link has a leading edge inclined from the vertical away from the direction of movement of said run of said chain to form a cam face, said member being a roller engageable with said cam face.

6. A conveying mechanism comprising a carriage, means for supporting said carriage for horizontal linear movement, a drive chain having an upper run movable in one direction parallel to said linear movement and including a link projecting upwardly from said chain, and a driving connection between said link and said carriage, said driving connection comprising supporting members connected to said carriage, bearing members pivotally connected to said supporting members, a driving member carried by said bearing members at a point spaced from the pivotal connection of such members with said supporting members, said link having a leading edge inclined from the vertical in a direction away from the direction of movement of said link to form a cam face, and means resiliently opposing turning movement of said bearing members relative to said supporting members to tend to maintain said driving member in engagement with said cam face for the propelling of said carriage thereby, and whereby, when movement of said carriage is arrested, said cam face will move said driving member upwardly to release the driving connection between such member and said cam face.

7. A mechanism according to claim 6 wherein said driving member is a roller rotatably connected to said bearing members to turn on an axis spaced from the pivotal connection of said bearing members with said supporting members in a direction away from the direction of movement of said projection.

8. A conveying mechanism comprising a carriage, means for supporting said carriage for horizontal linear movement, a drive chain having an upper run movable in one direction parallel to said linear movement and including a link projecting upwardly from said chain, and a driving connection between said projecting link and said carriage, said driving connection comprising a bracket fixed to said carriage and having a depending stationary flange, supporting arms carried by said bracket, a pivot pin carried by said supporting arms below said bracket, longitudinally extending bearing members mounted for turning movement on said pivot pin, said bearing members having ends extending from said pivot pin in a direction away from the direction of movement of said projecting link, a movable flange fixed to said bearing members and normally engaging said stationary flange, a driving member carried by said arms of said bearing members and normally engaging said projecting link, and resilient means opposing movement of said movable flange away from said stationary flange whereby said driving member is normally arranged in the path of travel of said projecting link and is movable upwardly for the passage of said projecting link under said driving member when movement of said carriage is arrested.

9. A mechanism according to claim 8 wherein said projecting link has a leading edge inclined from the vertical in the direction away from the direction of movement of said projecting link to form a cam face, said driving connection comprising a roller rotatably supported by said ends of said bearing arms and normally engaging said cam face.

10. A mechanism according to claim 8 wherein said resilient means comprises a compression spring, a bolt passing through said compression spring and through said movable flange and having a head at one end engaging said movable flange, said bolt having a head at the other end spaced from said stationary flange, said spring engaging at one end against said last-named head and at its other end against said stationary flange.

11. A conveying mechanism comprising spaced horizontal tracks, a dolly having wheels at opposite sides thereof engaging said tracks to support said dolly for movement therealong, a center track arranged between and extending parallel to said first-named tracks, a drive chain having links, pivot pins connecting said links and rollers surrounding said pivot pins, said drive chain having an upper run in which said rollers ride along said center track, said chain having a link projecting upwardly from said chain, and a driving connection between said projecting link and said dolly, said driving connection comprising a member supported by said dolly in the path of travel of said projecting link whereby the latter will propel said dolly with said upper run of said chain, said upwardly projecting link having cam action engagement with said member, said member being supported for upward movement, and resilient means connected to oppose such upward movement of said member with a predetermined force whereby said dolly will be normally propelled by said projecting link and said member will be movable upwardly by said projecting link by said cam action for the passage of the latter beneath said member when movement of said carriage is arrested.

12. A mechanism according to claim 11 wherein said links in the upper run of said chain depend below said rollers to act as guides for said upper run of said chain in the movement thereof along said center track.

References Cited in the file of this patent

UNITED STATES PATENTS

| | | |
|---|---|---|
| 797,610 | Schaefer | Aug. 22, 1905 |
| 1,083,308 | Thurston | Jan. 6, 1914 |
| 1,742,789 | Simpson | Jan. 7, 1930 |
| 2,129,538 | Steenstrup | Sept. 6, 1938 |
| 2,161,388 | Rosenthal | June 6, 1939 |
| 2,443,546 | Weggum | June 15, 1948 |
| 2,481,421 | Hayes | Sept. 6, 1949 |
| 2,572,011 | Cohen et al. | Oct. 23, 1951 |
| 2,619,370 | Leger | Nov. 25, 1952 |
| 2,619,916 | Rainier | Dec. 2, 1952 |
| 2,635,446 | Woodward | Apr. 28, 1953 |
| 2,863,398 | Granath | Dec. 9, 1958 |
| 2,885,969 | Kay et al. | May 12, 1959 |

OTHER REFERENCES

Hausherr, German application, Ser. No. H19521, II/20a, printed Mar. 29, 1956. Klasse 20a, Gruppe 14, 1 sht. dwg. 104–172. 4 pp. spec.

Renner, German application, Ser. No. F8315, XI/35a, printed Oct. 13, 1955. Klasse 35a, Gruppe 910, 2 shts. dwg. 104–172. 4 pp. spec.